(12) United States Patent
Fu et al.

(10) Patent No.: US 10,248,925 B2
(45) Date of Patent: Apr. 2, 2019

(54) SYSTEMS AND METHODS FOR COMPRESSING SHORTEST PATH MATRICES FOR DELIVERY ROUTE OPTIMIZATION

(71) Applicant: WAL-MART STORES, INC., Bentonville, AR (US)

(72) Inventors: Mingang Fu, Palo Alto, CA (US); Deepak Deshpande, San Jose, CA (US); Prakash Seetharaman, Santa Clara, CA (US); Devadas Pattathil, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 112 days.

(21) Appl. No.: 15/370,081

(22) Filed: Dec. 6, 2016

(65) Prior Publication Data

US 2018/0158013 A1    Jun. 7, 2018

(51) Int. Cl.
*G01C 21/34* (2006.01)
*G06Q 10/08* (2012.01)

(52) U.S. Cl.
CPC ....... *G06Q 10/083* (2013.01); *G01C 21/3446* (2013.01)

(58) Field of Classification Search
CPC .............................. G06Q 10/83; G01C 21/3446
See application file for complete search history.

(56) References Cited

U.S. PATENT DOCUMENTS

| | | | |
|---|---|---|---|
| 8,788,202 B2* | 7/2014 | Schilling | H03M 7/40 701/527 |
| 8,990,017 B2* | 3/2015 | Schilling | G01C 21/34 701/533 |
| 2007/0263544 A1 | 11/2007 | Yamanaka et al. | |
| 2011/0112759 A1* | 5/2011 | Bast | G01C 21/3423 701/533 |
| 2012/0254153 A1* | 10/2012 | Abraham | G06F 17/30707 707/716 |
| 2017/0336219 A1* | 11/2017 | Di Lorenzo | G06Q 10/047 |

* cited by examiner

*Primary Examiner* — Jess Whittington
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform an act of preparing an initial shortest path matrix including a plurality of elements, an initial number of a plurality of map intersection nodes, and a plurality of full shortest paths between an origination map intersection node and a destination map intersection node. Each element can include a full shortest path, and each full shortest path can include one or more map intersection nodes. The one or more processing modules also can be configured to compress the initial shortest path matrix to form a compressed shortest path matrix that includes a compressed number of the plurality of map intersection nodes that is fewer than the initial number of the plurality of map intersection nodes.

20 Claims, 8 Drawing Sheets

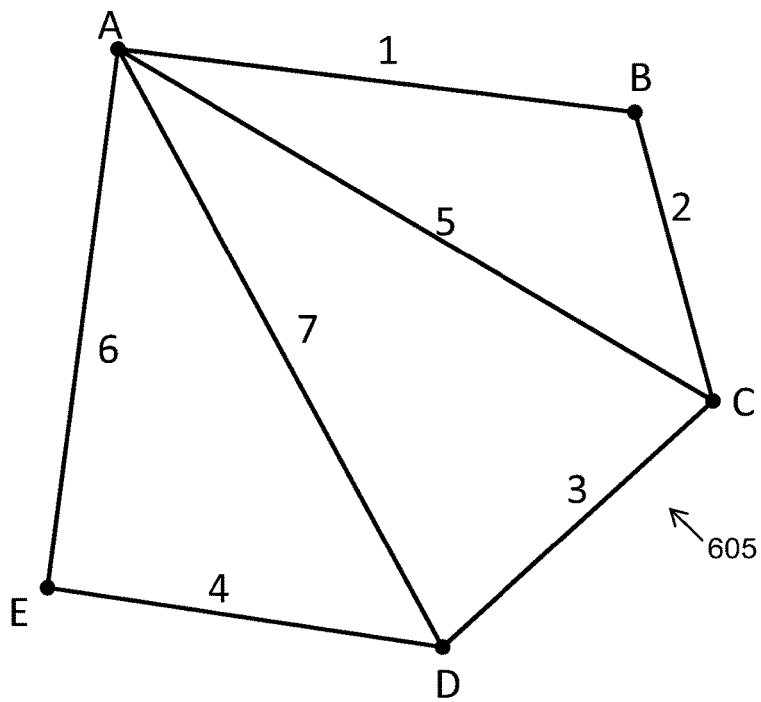
FIG. 6A
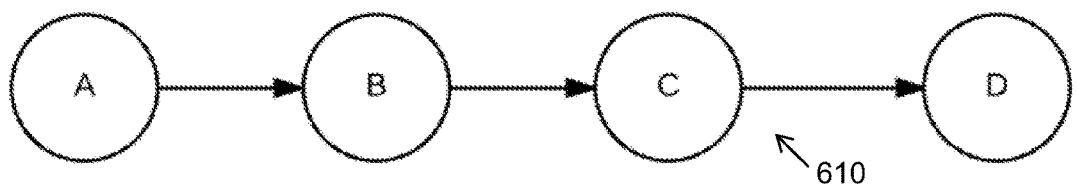
FIG. 6B
|   | D |
|---|---|
| A | B |
| B | C |
| C | D |
| D | D |
FIG. 6C

625

|   | A | B | C | D | E |
|---|---|---|---|---|---|
| A | A | A-B | A-B-C | A-B-C-D | A-E |
| B | B-A | B | B-C | B-C-D | B-A-E |
| C | C-B-A | C-B | C | C-D | C-D-E |
| D | D-C-B-A | D-C-B | D-C | D | D-E |
| E | E-A | E-A-B | E-D-C | E-D | E |

FIG. 6D

|   | A | B | C | D | E |
|---|---|---|---|---|---|
| A | A | B | B | B | E |
| B | A | B | C | C | A |
| C | B | B | C | D | D |
| D | C | C | C | D | E |
| E | A | A | D | D | E |

SYSTEMS AND METHODS FOR COMPRESSING SHORTEST PATH MATRICES FOR DELIVERY ROUTE OPTIMIZATION

TECHNICAL FIELD

This disclosure relates generally to compressing shortest path matrices for delivery route optimization of ecommerce website delivery orders.

BACKGROUND

Delivery route optimization is rated as a class of problems in computational complexity theory that is non-deterministic polynomial (NP)-time hard, or at least as hard as the hardest problem in NP. Pre-calculated shortest path matrices for graphs can be used to determine delivery routes. Conventional shortest path matrices for graphs are often too large for storage in a computer system that allows for efficient and real-time accessibility to the shortest path matrices. For example, a shortest path matrix for a graph of a large city with 116,000 partial delivery addresses or nodes can require 61 terabytes of storage. Such a large storage size reduces the accessibility and use of the shortest path matrix.

BRIEF DESCRIPTION OF THE DRAWINGS

To facilitate further description of the embodiments, the following drawings are provided in which:

FIG. 6A is a graph of map intersection nodes according to an embodiment;

FIG. 6B is a sample shortest path according to an embodiment;

FIG. 6C is a compressed shortest path according to an embodiment;

FIG. 6D is an initial shortest path matrix according to an embodiment;

FIG. 6E is a first compressed shortest path matrix according to an embodiment.

Figure 1:
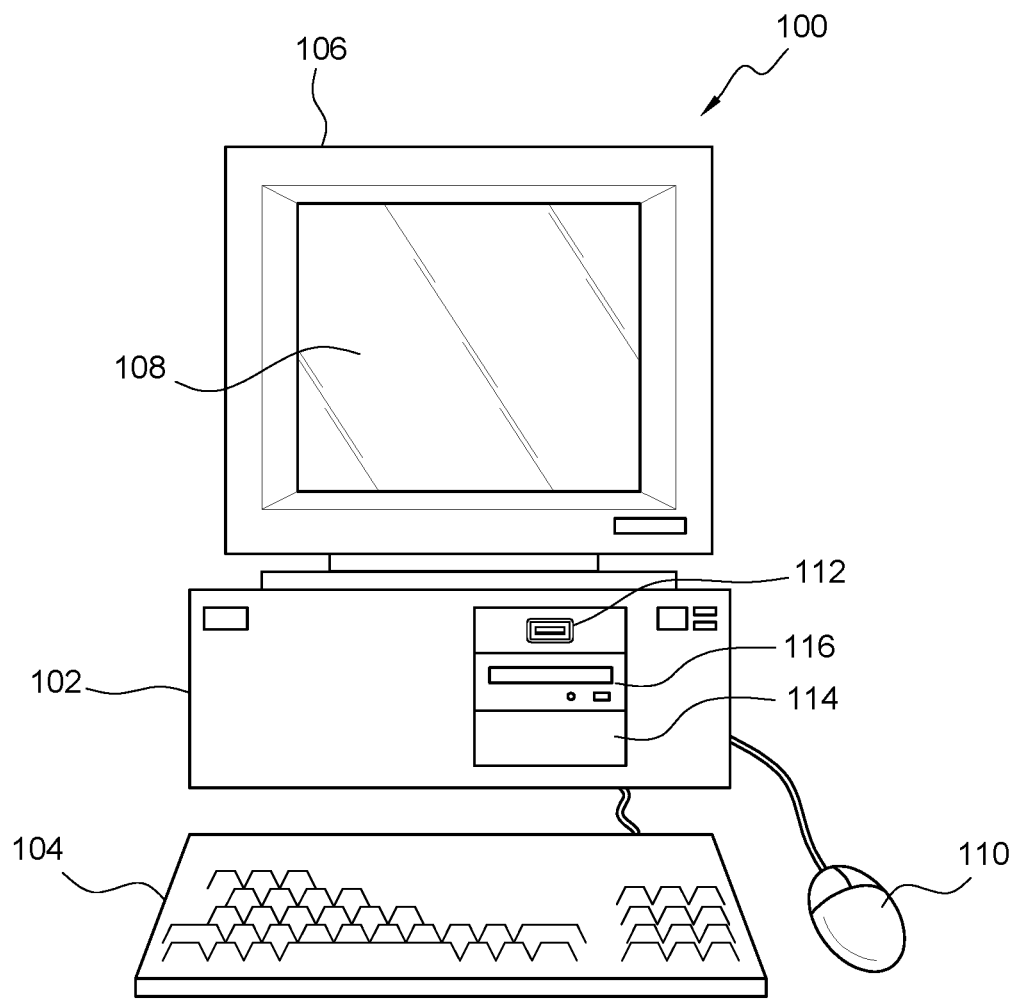
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of preparing an initial shortest path matrix comprising a plurality of elements, an initial number of a plurality of map intersection nodes, and a plurality of full shortest paths between an origination map intersection node and a destination map intersection node. Each element of the plurality of elements can comprise a full shortest path of the plurality of full shortest paths. Each full shortest path of the plurality of shortest paths can comprise one or more map intersection nodes of the plurality of map intersection nodes. The one or more storage modules also can be configured to run on the one or more processing modules and perform an act of obtaining a first set of compression rules for compressing, using the one or more processing modules, the initial shortest path matrix by reducing the plurality of map intersection nodes in the initial shortest path matrix. The one or more storage modules also can be configured to run on the one or more processing modules and perform an act of using the first set of compression rules and the one or more processing modules to compress the initial shortest path matrix to form a compressed shortest path matrix comprising a compressed number of the plurality of map intersection nodes that is fewer than the initial number of the plurality of map intersection nodes. The one or more storage modules also can be configured to run on the one or more processing modules and perform an act of receiving a first delivery order for delivery of a first order at a first location. The one or more storage modules also can be configured to run on the one or more processing modules and perform an act of determining a shortest path delivery route for the first delivery at the first location using the compressed shortest path matrix.

Various embodiments include a method. The method can include preparing an initial shortest path matrix comprising a plurality of elements, an initial number of a plurality of map intersection nodes, and a plurality of full shortest paths between an origination map intersection node and a destination map intersection node. Each element of the plurality of elements can comprise a full shortest path of the plurality of full shortest paths. Each full shortest path of the plurality of shortest paths can comprise one or more map intersection nodes of the plurality of map intersection nodes. The method also can include obtaining a first set of compression rules for compressing, using one or more processing modules, the initial shortest path matrix by reducing the plurality of map intersection nodes in the initial shortest path matrix. The method also can include using the first set of compression rules and the one or more processing modules to compress the initial shortest path matrix to form a compressed shortest path matrix comprising a compressed number of the plurality of map intersection nodes that is fewer than the initial number of the plurality of map intersection nodes. The method also can include receiving a first delivery order for delivery of a first order at a first location. The method also can include determining a shortest path delivery route for the first delivery at the first location using the compressed shortest path matrix.

A number of embodiments can include a system. The system can include one or more processing modules and one or more non-transitory storage modules storing computing instructions configured to run on the one or more processing modules. The one or more storage modules can be configured to run on the one or more processing modules and perform an act of preparing an initial shortest path matrix comprising a plurality of elements, an initial number of a plurality of map intersection nodes, and a plurality of full shortest paths between an origination map intersection node and a destination map intersection node. Each element of the plurality of elements can comprise a full shortest path of the plurality of full shortest paths, and each full shortest path of the plurality of shortest paths can comprise one or more map intersection nodes of the plurality of map intersection nodes. The one or more storage modules also can be configured to run on the one or more processing modules and perform an act of obtaining a first set of compression rules for compressing, using the one or more processing modules, the initial shortest path matrix by reducing the plurality of map intersection nodes in the initial shortest path matrix. The one or more storage modules also can be configured to run on the one or more processing modules and perform an act of using the first set of compression rules and the one or more processing modules to compress the initial shortest path matrix to form a compressed shortest path matrix comprising a compressed number of the plurality of map intersection nodes that is fewer than the initial number of the plurality of map intersection nodes.

Figure 2:
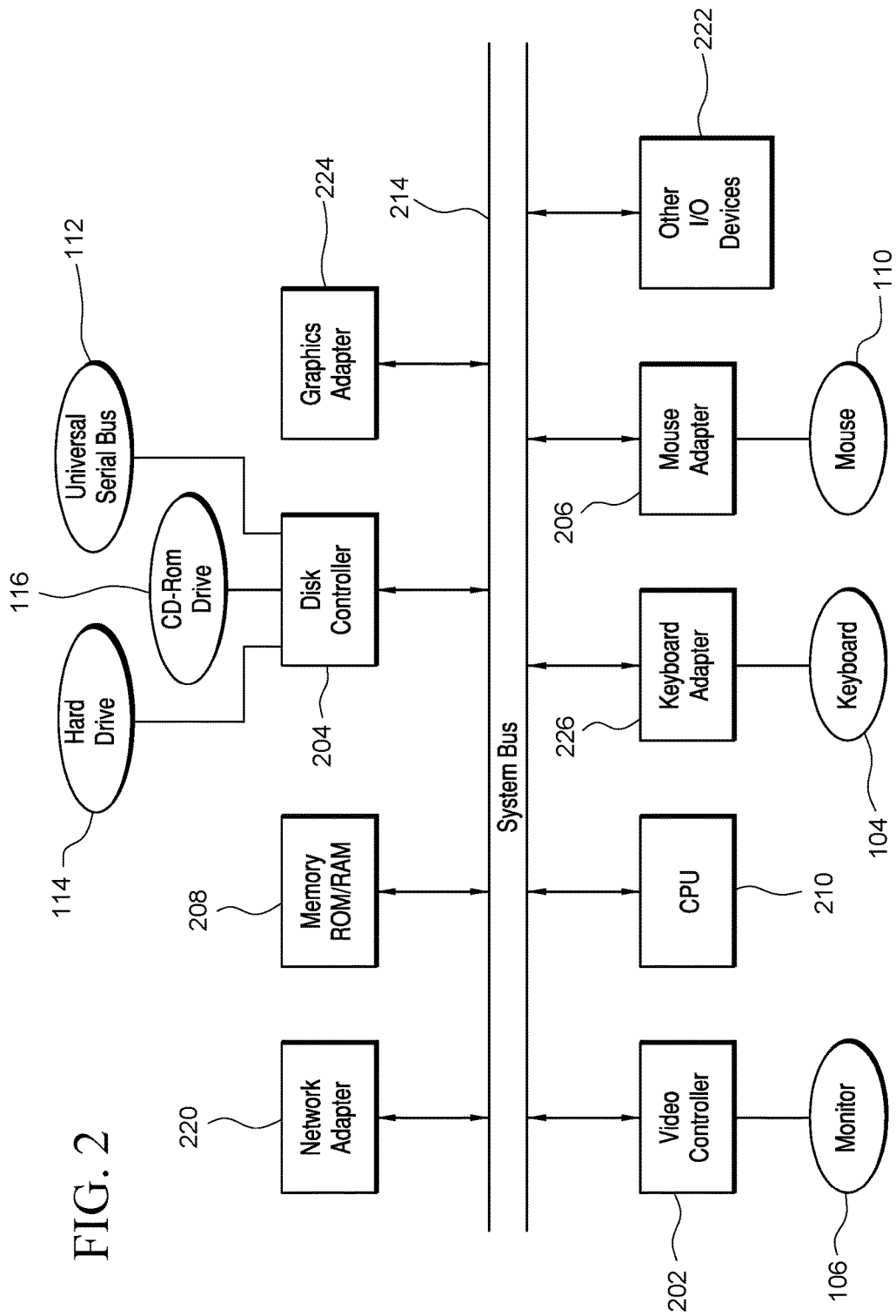
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
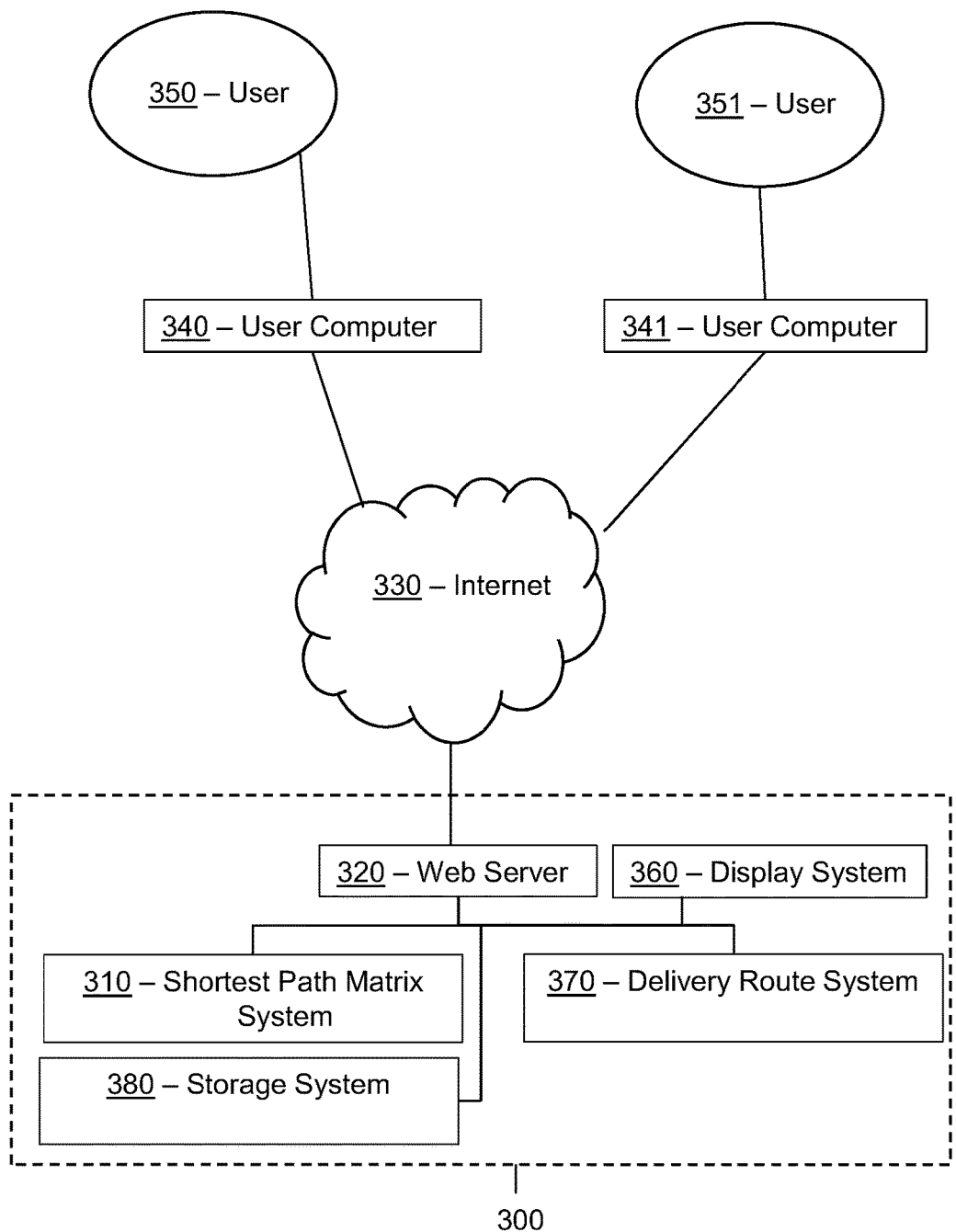
FIG. 3 illustrates a representative block diagram of a system, according to an embodiment.

Turning ahead in the drawings, FIG. 3 illustrates a block diagram of a system 300 that can be employed for compressing shortest path matrices for delivery route optimization. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a shortest path matrix system 310, a web server 320, a display system 360, a delivery route system 370, and/or a storage system 380. Shortest path matrix system 310, web server 320, display system 360, delivery route system 370, and/or storage system 380 can each be a computer system, such as computer system 100 (FIG. 1), as described above, and can each be a single computer, a single server, or a cluster or collection of computers or servers, or a cloud of computers or servers. In another embodiment, a single computer system can host each of two or more of shortest path matrix system 310, web server 320, display system 360, delivery route system 370, and/or storage system 380. Additional details regarding shortest path matrix system 310, web server 320, display system 360, delivery route system 370, and/or storage system 380 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, shortest path matrix system 310, web server 320, display system 360, delivery route system 370, and/or storage system 380 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) shortest path matrix system 310, web server 320, display system 360, delivery route system 370, and/or storage system 380 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of shortest path matrix system 310, web server 320, display system 360, delivery route system 370, and/or storage system 380. In a similar manner, the processing module(s) and the memory storage module(s) can be local and/or remote to each other.

In many embodiments, shortest path matrix system 310, web server 320, display system 360, delivery route system 370, and/or storage system 380 can be configured to communicate with one or more customer computers 340 and 341. In some embodiments, customer computers 340 and 341 also can be referred to as user computers. In some embodiments, shortest path matrix system 310, web server 320, display system 360, delivery route system 370, and/or storage system 380 can communicate or interface (e.g. interact) with one or more customer computers (such as customer computers 340 and 341) through a network or internet 330. Internet 330 can be an intranet that is not open to the public. Accordingly, in many embodiments, shortest path matrix system 310, web server 320, display system 360, delivery route system 370, and/or storage system 380 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, shortest path matrix system 310, web server 320, display system 360, delivery route system 370, and/or storage system 380 also can be configured to communicate with one or more databases. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between shortest path matrix system 310, web server 320, delivery route system 360, storage system 380, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
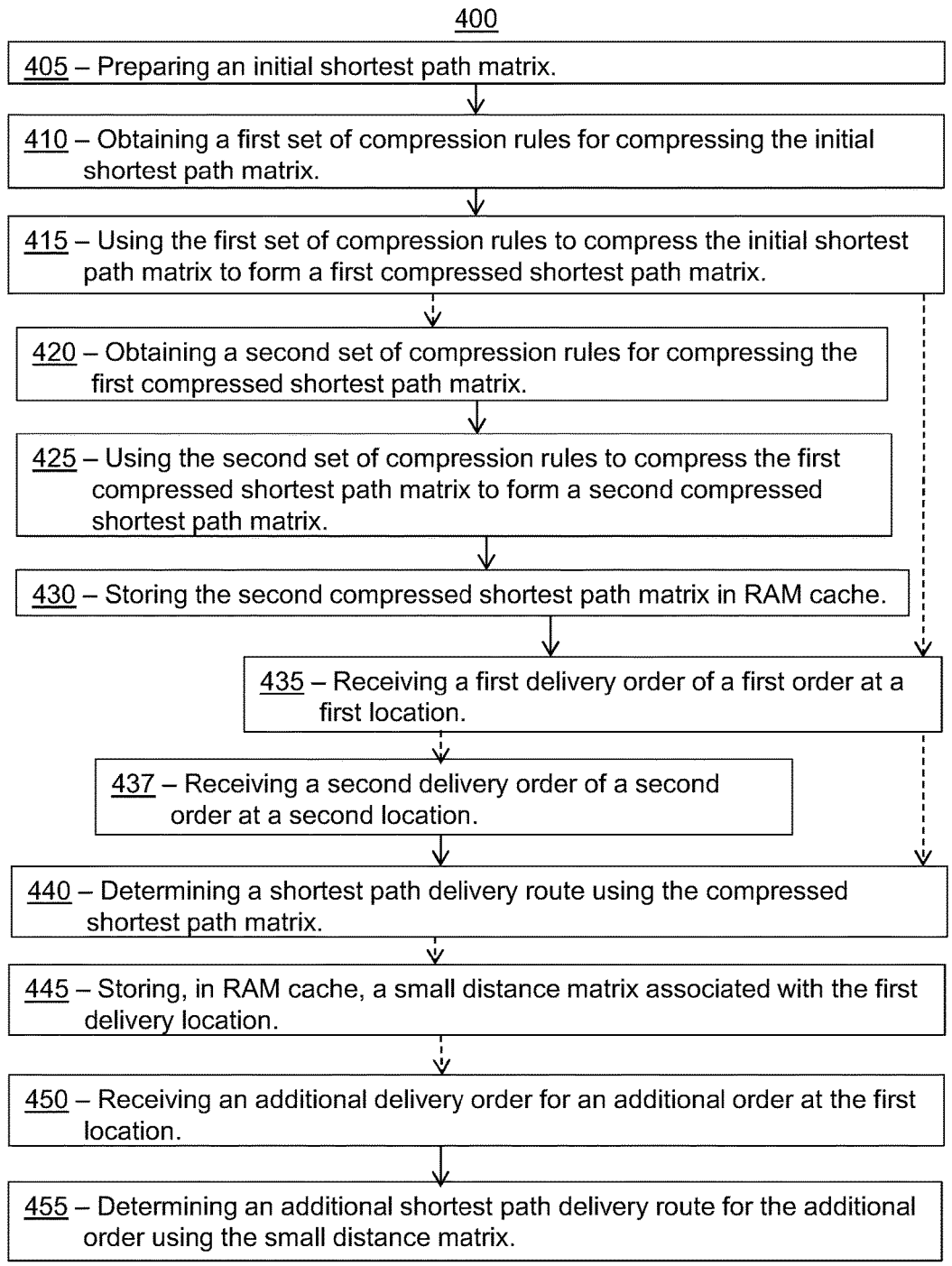
FIG. 4 is a flowchart for a method, according to certain embodiments.
Figure 5:
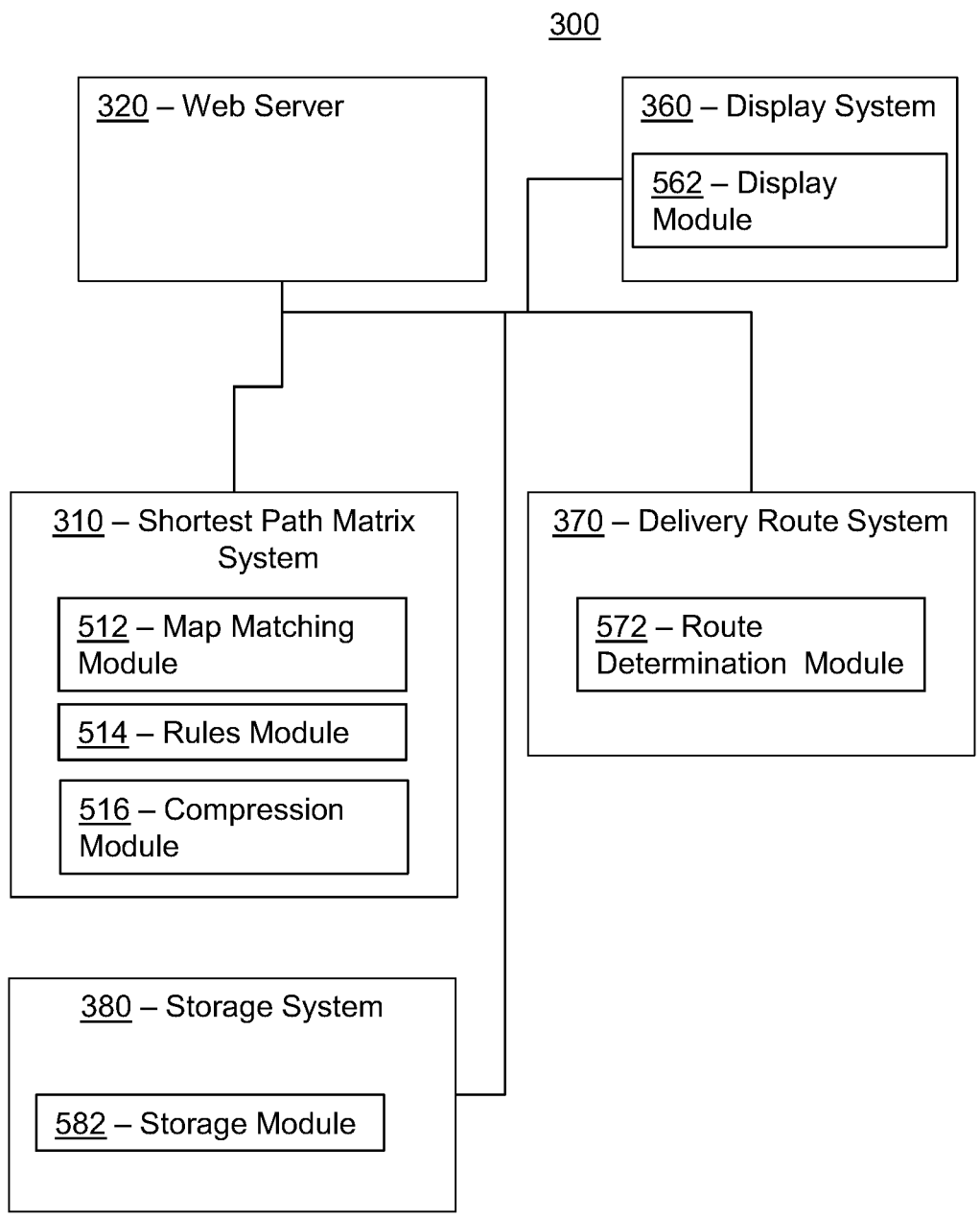
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 516, 562, 572, and/or 582 (FIG. 5). Such non-transitory memory storage modules can be part of a computer system such as shortest path matrix system 310 (FIGS. 3 & 5), web server 320 (FIGS. 3 & 5), display system 360 (FIGS. 3 & 5), delivery route system 370 (FIGS. 3 & 5), and/or storage system 380 (FIGS. 3 & 5). The processing module(s) can be similar or identical to the processing module(s) described above with respect to computer system 100 (FIG. 1).

In some embodiments, method 400 can optionally comprise an activity of transforming map data from one or more maps to graph data that can be used in preparing an initial shortest path matrix. In transforming map data to graph data, data elements in the graph data can comprise a geospatial link or road link between two nodes of the graph data. FIG. 6A illustrates a non-limiting example of a graph 605 that can be used in preparing an initial shortest path matrix. Graph 605 includes map intersection nodes A, B, C, D, and E, and geospatial or road links 1, 2, 3, 4, 5, 6, and 7 between the map intersection nodes. The road links are not drawn to scale. It is noted that each map intersection node can comprise an intersection of two or more of streets, railroads, highways, and/or geographic features such as but not limited to rivers, canals, lakes, parks, and the like. Other considerations in transforming map data to graph data can include but are not limited to vehicle accessibility, speed category, through traffic, and the like. In some embodiments, method 400 in FIG. 4 can optionally comprise an activity of map matching to find nearest intersections to addresses, such as but not limited to origination addresses and destination addresses. Map matching can comprise node matching, vertex matching, and/or road segment matching.

Method 400 can comprise an activity 405 of preparing an initial shortest path matrix. More particularly, the initial shortest path matrix can comprise a plurality of elements, an initial number of a plurality of map intersection nodes, and a plurality of full shortest paths between an origination map intersection node and a destination map intersection node. Each element of the plurality of elements can comprise a full shortest path of the plurality of full shortest paths, and each full shortest path of the plurality of shortest paths can comprise one or more map intersection nodes of the plurality of map intersection nodes.

In some embodiments, various algorithms can be used to prepare an initial shortest path matrix. For example, in some non-limiting embodiments, an A* algorithm can be used to solve a single pair shortest path problem, with a time complexity of O(E), where E is a total number of edges in a graph and O represent the Big O Notation. In some embodiments, the Big O Notation can represent a number of basic computer operations of an algorithm to solve a problem, such as but not limited to addition, subtraction, multiplication, lookup, and the like. A Big O Notation allows an administrator to compare time performance of different algorithms to solve the same problem, regardless of computer configurations. In some non-limiting embodiments, single source shortest paths (shortest path tree) problems can be solved with one or more of: a Bellman-Ford algorithm, where the time complexity is represented as O(VE), where V is a vetex that denotes a total number of vertices/nodes in a graph; a Dijkstra algorithm, where the time complexity is represented as $O(V^2)$; a Dijkstra algorithm with a binary heap, where the time complexity is represented as O((E+V) log V); and/or a Dijkstra with Fivonacci Heap, where the time complexity is represented as O(E+V log V). In some non-limiting embodiments, all pairs shortest paths problems can be solved with one or more of: a Floyd-Warshall algorithm, where time complexity is represented as $O(V^3)$; and/or a Johnson's algorithm, where time complexity is represented as $O(EV+V^2 \log V)$.

Turning ahead in the drawings to FIG. 6D, a non-limiting example of an initial shortest path matrix 625 is shown. In FIG. 6D, origination map intersection nodes are shown in the first column on the left, and destination map intersection nodes are shown on the top row. Initial shortest path matrix 625 of FIG. 6D refers to graph 605 shown in FIG. 6A. In FIG. 6D, the initial shortest path matrix 625 is based on graph 605 of FIG. 6A. While in this particular example, the shortest path can be determined by glancing at the weights of the edges in the graph, in more complex graphs multiple algorithms can be used to perform an activity of determining the shortest paths. For example, a Dijkstra Algorithm with Fibonacci Heap can be used to determine shortest paths of a complex graph. In the non-limiting example of FIG. 6D, each element comprises a full shortest path between two map intersection nodes, and each shortest path comprises one or more map intersection nodes. For example according to initial shortest path matrix 625 of FIG. 6D: the full shortest path between origination map intersection node A and destination map intersection node A is beginning at origination map intersection node A and ending at destination map intersection node A; the full shortest path between origination map intersection node A and destination map intersection node B is beginning at origination map intersection node A and then going to destination map intersection node B; the full shortest path between origination map intersection node A and destination map intersection node C is beginning at origination map intersection node A, going to map intersection node B, and then ending at destination map intersection node C; the full shortest path between origination map intersection node A and destination map intersection node D is beginning at origination map intersection node A, then going to map intersection node B, then going to map intersection node C, and the ending at destination map intersection node D; the full shortest path between origination map intersection node A and destination map intersection node E is beginning at origination map intersection node A and ending at destination map intersection node E; and so on. Thus, in some elements, a full shortest path is a single map intersection node, but in many elements, a full shortest path comprises a plurality of map intersection node nodes. FIG. 6B, for example, shows a non-limiting example of full shortest path 610 from origination map intersection node A to destination map intersection node D, which requires beginning at origination map intersection node A, then going to map intersection node B, then going to map intersection node C, and finally ending at destination map intersection node D. Full shortest path 610 comprises a plurality of map intersection nodes, as shown in the element on row A and column D of initial shortest path matrix 605 shown in FIG. 6D.

Returning to FIG. 4, method 400 can comprise an activity 410 of obtaining a first set of compression rules for compressing the initial shortest path matrix. More particularly, activity 410 can comprise obtaining a first set of compression rules for compressing, using the one or more processing modules, the initial shortest path matrix by reducing the plurality of map intersection nodes in the initial shortest path matrix. The first set of compression rules can comprise rules for using the one or more processing modules to compress the initial shortest path matrix to form a compressed shortest path matrix that can comprise a compressed number of the plurality of map intersection nodes that is fewer than the initial number of the plurality of map intersection nodes. For example, in some embodiments, the first set of compression rules can comprise rules for the one or more processing modules to compress the initial shortest path matrix to form a first compressed shortest path matrix by replacing the full shortest path between the origination map intersection node and the destination map intersection node in each element of the plurality of elements with a single map intersection node of the plurality of map intersection nodes. In some embodiments, the first set of compression rules also can comprise rules for the one or more processing modules to compress any full shortest paths comprising multiple map intersection nodes in elements of the initial shortest path matrix to a single map intersection node.

Method 400 can comprise an activity 415 of using the first set of compression rules to compress the initial shortest path matrix to form a first compressed shortest path matrix. In some embodiments, activity 415 can comprise using the first set of compression rules and the one or more processing modules to compress the initial shortest path matrix to form a first compressed shortest path matrix that can comprise a first compressed number of the plurality of map intersection nodes that is fewer than the initial number of the plurality of map intersection nodes by replacing the full shortest path between the origination map intersection node and the destination map intersection node in each element of the plurality of elements with a single map intersection node of the plurality of map intersection nodes.

In some embodiments, the single map intersection node for a respective element of the plurality of elements can comprise a next map intersection node in the full shortest path of the respective element of the plurality of elements. In elements of the initial shortest path matrix with only a single node in the full shortest path, the next map intersection node in the full shortest path comprises the single node from the initial shortest path matrix. In elements of the initial shortest path matrix with multiple map intersection nodes in the full shortest path, the next map intersection node comprises the second map intersection node in the full shortest path. Thus, after using the first set of compression rules to compress the initial shortest path matrix, elements of the initial shortest path matrix comprising multiple map intersection nodes of the plurality of map intersection nodes are compressed to comprise only a single map intersection node of the plurality of map intersection nodes in the first compressed shortest path matrix.

Turning ahead in the drawings to FIG. 6C, a non-limiting example of a compressed shortest path 615 of shortest path 610 of FIG. 6B is shown. Rather than include full shortest path A-B-C-D in the element of origination map intersection node A and destination map intersection node D, the element has been compressed comprise only a single, next map intersection node B in the element of origination map intersection node A and destination map intersection node D. Then, moving to the element of origination map intersection node B and destination map intersection node D because the single, next map intersection node was B in the element of origination map intersection node A and destination map intersection node D, a single, next map intersection node C is in the element of origination map intersection node B and destination map intersection node D. Then, moving to the element of origination map intersection node C and destination map intersection node D because the single, next map intersection node was C in the element of origination map intersection node B and destination map intersection node D, a single, next map intersection node D is in the element of origination map intersection node C and destination map intersection node D. Then, moving to the element of origination map intersection node D and destination map intersection node D because the single, next map intersection node was D in the element of origination map intersection node C and destination map intersection node D, a single, next map intersection node D is in the element of origination map intersection node D and destination map intersection node D.

Turning further ahead in the drawings to FIG. 6E, a non-limiting example of a first compressed shortest path matrix 630 is shown. More particularly, initial shortest path matrix 625 of FIG. 6D has been compressed using an embodiment of the first set of compression rules to form first compressed shortest path matrix 630. For example, in elements of initial shortest path matrix 625 of FIG. 6D with only a single map intersection node in the full shortest path, the next map intersection node in the full shortest path comprises the single map intersection node from the element of initial shortest path matrix 625. With specific reference to the non-limiting initial shortest path matrix 625 shown in FIG. 6D, the next map intersection node in the full shortest path from origination A to destination A is map intersection node A. Thus, the single map intersection node from origination map intersection node A to destination map intersection node A in first compressed shortest path matrix 630 is map intersection node A.

By way of another example in elements of initial shortest path matrix 625 of FIG. 6D with multiple map intersection nodes in the full shortest path, the next map intersection node in the full shortest path is the second map intersection node from the element of initial shortest path matrix 625. With specific reference to the non-limiting initial shortest path matrix 625 shown in FIG. 6D, the next map intersection node in the full shortest path from origination map intersection node A to destination map intersection node B is map intersection node B. Thus, the single map intersection node from origination map intersection node A to destination map intersection node B in first compressed shortest path matrix 630 is map intersection node B. Similarly, the next map intersection node in the full shortest path from origination map intersection node A to destination map intersection node D is map intersection node B in initial shortest path matrix 625. Thus, the single map intersection node from origination map intersection node A to destination map intersection node D in first compressed shortest path matrix 630 is map intersection node B.

Returning to FIG. 4, method 400 can optionally comprise an activity 420 of obtaining a second set of compression rules for compressing the first compressed shortest path matrix. In some embodiments, activity 420 can comprise obtaining a second set of compression rules for compressing, using the one or more processing modules, the first compressed shortest path matrix by reducing the plurality of map intersection nodes in the first compressed shortest path matrix. The second set of compression rules can comprise rules for using the one or more processing modules to compress adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes.

Returning to FIG. 4, method 400 can optionally comprise an activity 425 of using the second set of compression rules to compress the first compressed shortest path matrix to form a second compressed shortest path matrix. In some embodiments, activity 425 can comprise using the second set of compression rules and the one or more processing modules to compress the first compressed shortest path matrix to form a second compressed shortest path matrix. The second compressed shortest path matrix can comprise a second compressed number of the plurality of map intersection nodes that is fewer in number than the first compressed number of the plurality of map intersection nodes. The first compressed shortest path matrix can be compressed using the one or more processing modules to compress adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes.

Figure 6F:
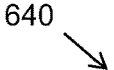
FIG. 6F is a second compressed shortest path matrix according to an embodiment.

Turning ahead to FIG. 6F, a non-limiting example of a second compressed shortest path matrix 640 is shown. Second compressed shortest path matrix 640 was formed from first compressed shortest path matrix 630 using an embodiment of the second set of compression rules. More particularly, adjacent elements of the plurality of elements in a row in first compressed shortest path matrix 630 have been compressed to form a single interval comprising a single interval map intersection node of the plurality of map intersection nodes in second compressed shortest path matrix 640 when the adjacent elements comprise identical map intersection nodes of the plurality of map intersection nodes. For example, in the top row of first compressed shortest path matrix 630 of FIG. 6E, the map intersection node B is in the adjacent element for each of origination map intersection node A and destination map intersection node B, origination map intersection node A and destination map intersection node C, and origination map intersection node A and destination map intersection node D. Thus, using the second set of compression rules, these adjacent elements have been compressed to form a single interval comprising only single interval map intersection node B in second compressed shortest path matrix 640 of FIG. 6F.

Compressing a shortest path matrix can reduce the memory required for the shortest path matrix, and thus improve the overall efficiency of a computer system utilizing the shortest path matrix. For example, a city like Manhattan can include a graph of approximately 8,000 map intersection nodes. A graph of 8,000 map intersection nodes requires approximately 20 gigabytes (GB) of memory in hard disk storage for an initial shortest path matrix. Using a first set of compression rules, the initial shortest path matrix for a graph of 8,000 map intersection nodes can be compressed to form a first compressed shortest path matrix for a graph of 8,000 map intersection nodes that requires 0.4 GB of memory that can be stored in either hard disk storage or RAM. Using a second set of compression rules, the first compressed shortest path matrix for a graph of 8,000 map intersection nodes can be compressed to form a second compressed shortest path matrix for a graph of 8,000 map intersection nodes that requires 0.04 GB of memory that can be stored in RAM.

By way of another example, a large area like Denver can include a graph of approximately 116,000 nodes. A graph of 116,000 map intersection nodes requires approximately 61 terabytes (TB) of memory in hard disk storage for an initial shortest path matrix. Using a first set of compression rules, the initial shortest path matrix for a graph of 116,000 map intersection nodes can be compressed to form a first compressed shortest path matrix for a graph of 116,000 map intersection nodes that requires 84 GB of memory that can be stored in either hard disk storage. Using a second set of compression rules, the first compressed shortest path matrix for a graph of 116,000 map intersection nodes can be compressed to form a second compressed shortest path matrix for a graph of 116,000 map intersection nodes that requires 2.14 GB of memory that can be stored in RAM cache.

Returning to FIG. 4, because the size reduction from the initial shortest path matrix to the second compressed shortest path matrix, method 400 can optionally comprise an activity 430 of storing the second compressed shortest path matrix in RAM cache or other cache memory. In some embodiments, method 400 also can optionally comprise an activity of storing the first compressed shortest path matrix in RAM cache. By storing the first compressed shortest path matrix and/or second compressed shortest path matrix in RAM cache, the respective shortest path matrix can be scaled in production and accessed in memory in real time to determine a shortest path for delivery of one or more products at one or more locations. Furthermore, by compressing the first compressed shortest path matrix and/or the second compressed shortest path matrix for storage in RAM cache, the engineering obstacle of only being able to store shortest path matrices for graphs of large areas with large amounts of map intersection nodes in hard disk storage is overcome.

Method 400 can optionally comprise an activity 435 of receiving a first delivery order for delivery of a first order at a first location. The first delivery order can be made on an ecommerce website by a user, and the first order can comprise one or more products sold on the ecommerce website. In some embodiments, method 400 can optionally comprise an activity using the first compressed shortest path matrix or the second compressed shortest path matrix to determine a first plurality of delivery dates and delivery times of the first order at the first location. For example, because the second compressed matrix is compressed and stored in RAM cache, system 300 (FIG. 3) can determine in real time what delivery times and delivery dates are available based on other previously scheduled orders and/or the proximity of the first location to the origination shipping facility. Method 400 can optionally comprise an activity of coordinating a display of the first plurality of delivery dates and delivery times in view slots on an electronic device of the user.

Returning to FIG. 4, method 400 can optionally comprise an activity 437 of receiving a second delivery order for delivery of a second order at a second location. The second delivery order also can be made on an ecommerce website by a user, and the second order can comprise one or more products sold on the ecommerce website. In some embodiments, method 400 can optionally comprise an activity of using the first compressed shortest path matrix or the second compressed shortest path matrix to determine a second plurality of delivery times of the second order at the second location. For example, because the second compressed matrix is compressed and stored in RAM cache, system 300 (FIG. 3) can determine in real time what delivery times and delivery dates are available based on other previously scheduled orders, such as the first delivery order at the first location, and/or the proximity of the second location to the origination shipping facility and the first location. Method 400 can optionally comprise an activity of coordinating a display of the second plurality of delivery dates and delivery times in view slots on an electronic device of the user.

Method 400 can optionally comprise an activity 440 of determining a shortest path delivery route using the compressed shortest path matrix. More particularly, activity 440 can comprise determining a shortest path delivery route for the first delivery at the first location using the first compressed shortest path matrix and/or the second compressed shortest path matrix. In some embodiments, activity 440 can further comprise determining the shortest path delivery route for the first delivery at the first location and also for the second delivery at the second location using the compressed shortest path matrix.

In some embodiments, determining a shortest path using the compressed shortest path matrix can comprise determining a shortest path using the first compressed shortest path matrix as stored on a hard disk. In such embodiments, system 300 (FIG. 3) can read the hard disk and slice the first compressed shortest path matrix into columns of shortest paths to determine the shortest path, with a limiting behavior of the function comprising the average number of nodes per shortest path. In some embodiments, determining a shortest path using the compressed shortest path matrix can comprise determining a shortest path using the first compressed shortest path matrix as stored in RAM cache or other cache. In such embodiments, system 300 (FIG. 3) can read the RAM cache and slice the first compressed shortest path matrix into columns of shortest paths to determine the shortest path, with a limiting behavior of the function comprising the average number of nodes per shortest path. In some embodiments, determining a shortest path using the compressed shortest path matrix can comprise determining a shortest path using the second compressed shortest path matrix as stored in RAM cache or other cache. In such embodiments, system 300 (FIG. 3) can read the as stored in RAM cache or other cache to determine the shortest path, with a limiting behavior of the function comprising the log of the average number of nodes per shortest path and the average number of intervals per origination map intersection node.

Method 400 can optionally comprise an activity 445 of storing, in RAM cache, a small distance matrix associated with the first delivery location. More particularly, activity 445 can comprise storing, in cache such as but not limited to RAM cache, a small distance matrix associated with the first delivery location and retrieved from the compressed shortest path matrix after receiving the first delivery order.

A small distance matrix can be a matrix with map intersection nodes particular to the first delivery location, and can be significantly smaller in size than the second compressed shortest path matrix. In other embodiments, a small distance matrix can comprise map intersection nodes also pertaining to the second delivery location, and/or additional delivery locations. In some embodiments, method 400 can comprise an activity of performing a lookup directly in a same column to find a next node in the shortest path of a first compressed matrix, and/or an activity of performing a binary search to find a correct interval in the second compressed matrix.

Method 400 can optionally comprise an activity 450 of receiving an additional delivery order for an additional order at the first location. Method 400 can optionally comprise an activity 455 of determining an additional shortest path delivery route for the additional order using the small distance matrix. More particularly, activity 455 can comprise determining an additional shortest path delivery route for the additional delivery at the first location using the small distance matrix stored in the cache memory. In other embodiments, an additional shortest path delivery route also can comprise deliveries at the second location and other locations in addition to the first location. Because the small distance matrix is stored in RAM cache, the shortest path(s) are quickly and efficiently identifiable by the system 300 (FIG. 3).

Turning ahead in the drawings, FIG. 5 illustrates a block diagram of a portion of system 300 comprising shortest path matrix system 310, web server 320, display system 360, delivery route system 370, and/or storage system 380, according to the embodiment shown in FIG. 3. Each of shortest path matrix system 310, web server 320, display system 360, delivery route system 370, and/or storage system 380, is merely exemplary and not limited to the embodiments presented herein. Each of shortest path matrix system 310, web server 320, display system 360, delivery route system 370, and/or storage system 380, can be employed in many different embodiments or examples not specifically depicted or described herein. In some embodiments, certain elements or modules of shortest path matrix system 310, web server 320, display system 360, delivery route system 370, and/or storage system 380, can perform various procedures, processes, and/or acts. In other embodiments, the procedures, processes, and/or acts can be performed by other suitable elements or modules.

In many embodiments, shortest path matrix system 310 can comprise non-transitory memory storage modules 512, 514, and 516. Memory storage module 512 can be referred to as map matching module 512. In many embodiments, map matching module 512 can store computer instructions configured to run on one or more processing modules and perform one or more acts of method 400 (FIG. 4) (e.g., an activity of transforming map data from one or more maps to graph data, activity 405 of preparing an initial shortest path matrix (FIG. 4)). Memory storage module 514 can be referred to as rules module 514. In many embodiments, rules module 514 can store computer instructions configured to run on one or more processing modules and perform one or more acts of method 400 (FIG. 4) (e.g. activity 410 of obtaining a first set of compression rules for compressing the initial shortest path matrix and activity 420 of obtaining a second set of compression rules for compressing the first compressed shortest path matrix (FIG. 4)). Memory storage module 516 can be referred to as compression module 516. In many embodiments, compression module 516 can store computer instructions configured to run on one or more processing modules and perform one or more acts of method 400 (FIG. 4) (e.g. activity 415 of using the first set of compression rules to compress the initial shortest path matrix to form a first compressed shortest path matrix and activity 425 of using the second set of compression rules to compress the first compressed shortest path matrix to form a second compressed shortest path matrix (FIG. 4)).

In many embodiments, display system 360 can comprise a non-transitory memory storage module 562. Memory storage module 562 can be referred to as display module 562. In many embodiments, display module 562 can store computer instructions configured to run on one or more processing modules and perform one or more acts of method 400 (FIG. 4) (e.g. an activity of coordinating a display of the first plurality of delivery dates and delivery times in view slots on an electronic device of the user, and an activity of coordinating a display of the second plurality of delivery dates and delivery times in view slots on an electronic device of the user).

In many embodiments, delivery route system 370 can comprise a non-transitory memory storage module 572. Memory storage module 572 can be referred to as route determination module 572. In many embodiments, route determination module 572 can store computer instructions configured to run on one or more processing modules and perform one or more acts of method 400 (FIG. 4) (e.g. activity 435 of receiving a first delivery order of a first order at a first location, activity 437 of receiving a second delivery order of a second order at a second location, activity 440 of determining a shortest path delivery route using the compressed shortest path matrix, activity 450 of receiving an additional delivery order for an additional order at the first location, and activity 455 of determining an additional shortest path delivery route for the additional order using the small distance matrix (FIG. 4)).

In many embodiments, storage system 380 can comprise a non-transitory memory storage module 582. Memory storage module 582 can be referred to as storage module 582. In many embodiments, storage module 582 can store computer instructions configured to run on one or more processing modules and perform one or more acts of method 400 (FIG. 4) (e.g. activity 430 of storing the second compressed shortest path matrix in RAM and activity 445 of storing, in cache memory, a small distance matrix associated with the first delivery location (FIG. 4)).

Although systems and methods for compressing shortest path matrices for delivery route optimization have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform acts of:
  preparing an initial shortest path matrix comprising a plurality of elements, an initial number of a plurality of map intersection nodes, and a plurality of full shortest paths between an origination map intersection node and a destination map intersection node, wherein each element of the plurality of elements comprises a full shortest path of the plurality of full shortest paths, and each full shortest path of the plurality of full shortest paths comprises one or more map intersection nodes of the plurality of map intersection nodes;
  obtaining a first set of compression rules for compressing, using the one or more processors, the initial shortest path matrix by reducing the plurality of map intersection nodes in the initial shortest path matrix;
  using the first set of compression rules and the one or more processors to compress the initial shortest path matrix to form a compressed shortest path matrix comprising a compressed number of the plurality of map intersection nodes that is fewer than the initial number of the plurality of map intersection nodes;
  receiving a first delivery order for delivery of a first order at a first location; and
  determining a shortest path delivery route for the first delivery order at the first location using the compressed shortest path matrix,
wherein:
  using the first set of compression rules and the one or more processors to compress the initial shortest path matrix to form the compressed shortest path matrix comprises using the first set of compression rules and the one or more processors to compress the initial shortest path matrix to form a first compressed shortest path matrix by replacing the full shortest path between the origination map intersection node and the destination map intersection node in each element of the plurality of elements with a single map intersection node of the plurality of map intersection nodes;
  the compressed number of the plurality of map intersection nodes that is fewer than the initial number of the plurality of map intersection nodes comprises a first compressed number of the plurality of map intersection nodes that is fewer than the initial number of the plurality of map intersection nodes;
  the single map intersection node for a respective element of the plurality of elements comprises a next map intersection node in the full shortest path of the respective element of the plurality of elements; and determining the shortest path delivery route for the first delivery order at the first location using the compressed shortest path matrix comprises determining the shortest path delivery route using the first compressed shortest path matrix.

2. The system of claim 1, wherein:

one or more full shortest paths of the plurality of full shortest paths of the initial shortest path matrix comprise multiple map intersection nodes of the plurality of map intersection nodes; and the one or more non-transitory storage devices storing the computing instructions are configured to run on the one or more processors and perform an act of:

using the first set of compression rules and the one or more processors to compress each of the one or more full shortest paths of the plurality of full shortest paths comprising the multiple map intersection nodes of the plurality of map intersection nodes in the initial shortest path matrix to form the single map intersection node of the plurality of map intersection nodes in the first compressed shortest path matrix.

3. The system of claim 1, wherein:

the one or more non-transitory storage devices storing the computing instructions are configured to run on the one or more processors and perform acts of:

obtaining a second set of compression rules for compressing, using the one or more processors, the first compressed shortest path matrix by reducing the plurality of map intersection nodes in the first compressed shortest path matrix;

using the second set of compression rules and the one or more processors to compress the first compressed shortest path matrix to form a second compressed shortest path matrix comprising a second compressed number of the plurality of map intersection nodes that is fewer in number than the first compressed number of the plurality of map intersection nodes by compressing adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes; and storing the second compressed shortest path matrix in random access memory cache; and determining the shortest path delivery route for the first delivery order at the first location using the compressed shortest path matrix comprises determining the shortest path delivery route using the second compressed shortest path matrix.

4. The system of claim 1, wherein the one or more non-transitory storage devices storing the computing instructions are configured to run on the one or more processors and perform an act of storing, in a random access memory cache, a small distance matrix associated with the first location and retrieved from the compressed shortest path matrix after receiving the first delivery order, the small distance matrix being smaller than the compressed shortest path matrix.

5. The system of claim 4, wherein the one or more non-transitory storage devices storing the computing instructions are configured to run on the one or more processors and perform acts of:

receiving an additional delivery order for an additional delivery at the first location; and determining an additional shortest path delivery route for the additional delivery at the first location using the small distance matrix stored in the random access memory cache.

6. The system of claim 1, wherein:

one or more full shortest paths of the plurality of full shortest paths of the initial shortest path matrix comprise multiple map intersection nodes of the plurality of map intersection nodes;

the one or more non-transitory storage devices storing the computing instructions are configured to run on the one or more processors and perform acts of:

using the first set of compression rules and the one or more processors to compress each full shortest path of the plurality of full shortest paths comprising the one or more map intersection nodes of the plurality of map intersection nodes in the initial shortest path matrix to form the single map intersection node of the plurality of map intersection nodes in the first compressed shortest path matrix;

obtaining a second set of compression rules for compressing, using the one or more processors, the first compressed shortest path matrix by reducing the plurality of map intersection nodes in the first compressed shortest path matrix;

using the second set of compression rules and the one or more processors to compress the first compressed shortest path matrix to form a second compressed shortest path matrix comprising a second compressed number of the plurality of map intersection nodes that is fewer in number than the compressed number of the plurality of map intersection nodes by compressing adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes;

storing the second compressed shortest path matrix in a random access memory cache;

storing, in the random access memory cache, a small distance matrix associated with the first location and retrieved from the second compressed shortest path matrix after receiving the first delivery order, the small distance matrix being smaller than the compressed shortest path matrix;

receiving an additional delivery order for an additional delivery at the first location;

determining an additional shortest path delivery route for the additional delivery at the first location using the small distance matrix stored in the random access memory cache; and receiving a second delivery order for delivery of a second order at a second location; and determining the shortest path delivery route for the first delivery order at the first location using the compressed shortest path matrix comprises determining the shortest path delivery route for the first delivery order at the first location and also for the second delivery order at the second location using the second compressed shortest path matrix.

7. A system comprising:
one or more processors; and
one or more non-transitory storage devices storing computing instructions configured to run on the one or more processors and perform acts of:
preparing an initial shortest path matrix comprising a plurality of elements, an initial number of a plurality of map intersection nodes, and a plurality of full shortest paths between an origination map intersection node and a destination map intersection node, wherein each element of the plurality of elements comprises a full shortest path of the plurality of full shortest paths, and each full shortest path of the plurality of full shortest paths comprises one or more map intersection nodes of the plurality of map intersection nodes;
obtaining a first set of compression rules for compressing, using the one or more processors, the initial shortest path matrix by reducing the plurality of map intersection nodes in the initial shortest path matrix;
using the first set of compression rules and the one or more processors to compress the initial shortest path matrix to form a compressed shortest path matrix comprising a compressed number of the plurality of map intersection nodes that is fewer than the initial number of the plurality of map intersection nodes;
receiving a first delivery order for delivery of a first order at a first location; and
determining a shortest path delivery route for the first delivery order at the first location using the compressed shortest path matrix,
wherein:
the one or more non-transitory storage devices storing the computing instructions are configured to run on the one or more processors and perform an act of receiving a second delivery order for delivery of a second order at a second location; and
determining the shortest path delivery route for the first delivery order at the first location using the compressed shortest path matrix comprises determining the shortest path delivery route for the first delivery order at the first location and also for the second delivery order at the second location using the compressed shortest path matrix.

8. A method comprising:
preparing an initial shortest path matrix comprising a plurality of elements, an initial number of a plurality of map intersection nodes, and a plurality of full shortest paths between an origination map intersection node and a destination map intersection node, wherein each element of the plurality of elements comprises a full shortest path of the plurality of full shortest paths, and each full shortest path of the plurality of full shortest paths comprises one or more map intersection nodes of the plurality of map intersection nodes;
obtaining a first set of compression rules for compressing, using one or more processors, the initial shortest path matrix by reducing the plurality of map intersection nodes in the initial shortest path matrix;
using the first set of compression rules and the one or more processors to compress the initial shortest path matrix to form a compressed shortest path matrix comprising a compressed number of the plurality of map intersection nodes that is fewer than the initial number of the plurality of map intersection nodes;
receiving a first delivery order for delivery of a first order at a first location; and
determining a shortest path delivery route for the first delivery order at the first location using the compressed shortest path matrix,
wherein:
using the first set of compression rules and the one or more processors to compress the initial shortest path matrix to form the compressed shortest path matrix comprises using the first set of compression rules and the one or more processors to compress the initial shortest path matrix to form a first compressed shortest path matrix by replacing the full shortest path between the origination map intersection node and the destination map intersection node in each element of the plurality of elements with a single map intersection node of the plurality of map intersection nodes;
the compressed number of the plurality of map intersection nodes that is fewer than the initial number of the plurality of map intersection nodes comprises a first compressed number of the plurality of map intersection nodes that is fewer than the initial number of the plurality of map intersection nodes;
the single map intersection node for a respective element of the plurality of elements comprises a next map intersection node in the full shortest path of the respective element of the plurality of elements; and
determining the shortest path delivery route for the first delivery order at the first location using the compressed shortest path matrix comprises determining the shortest path delivery route using the first compressed shortest path matrix.

9. The method of claim 8, wherein:
one or more full shortest paths of the plurality of full shortest paths of the initial shortest path matrix comprise multiple map intersection nodes of the plurality of map intersection nodes; and
the method further comprises:
using the first set of compression rules and the one or more processors to compress each of the one or more full shortest paths of the plurality of full shortest paths comprising the multiple map intersection nodes of the plurality of map intersection nodes in the initial shortest path matrix to form the single map intersection node of the plurality of map intersection nodes in the first compressed shortest path matrix.

10. The method of claim 8, wherein:
the method further comprises:
obtaining a second set of compression rules for compressing, using the one or more processors, the first compressed shortest path matrix by reducing the plurality of map intersection nodes in the first compressed shortest path matrix;
using the second set of compression rules and the one or more processors to compress the first compressed shortest path matrix to form a second compressed shortest path matrix comprising a second compressed number of the plurality of map intersection nodes that is fewer in number than the first compressed number of the plurality of map intersection nodes by compressing adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes; and storing the second compressed shortest path matrix in a random access memory cache; and determining the shortest path delivery route for the first delivery order at the first location using the compressed shortest path matrix comprises determining the shortest path delivery route using the second compressed shortest path matrix.

11. The method of claim 8, further comprising storing, in a random access memory cache, a small distance matrix associated with the first location and retrieved from the compressed shortest path matrix after receiving the first delivery order, the small distance matrix being smaller than the compressed shortest path matrix.

12. The method of claim 11, further comprising:
receiving an additional delivery order for an additional delivery at the first location; and
determining an additional shortest path delivery route for the additional delivery at the first location using the small distance matrix stored in the random access memory cache.

13. The method of claim 8, wherein:
one or more full shortest paths of the plurality of full shortest paths of the initial shortest path matrix comprise multiple map intersection nodes of the plurality of map intersection nodes;
the method further comprises:
using the first set of compression rules and the one or more processors to compress each full shortest paths of the plurality of full shortest paths comprising the one or more map intersection nodes of the plurality of map intersection nodes in the initial shortest path matrix to form the single map intersection node of the plurality of map intersection nodes in the first compressed shortest path matrix;
obtaining a second set of compression rules for compressing, using the one or more processors, the first compressed shortest path matrix by reducing the plurality of map intersection nodes in the first compressed shortest path matrix;
using the second set of compression rules and the one or more processors to compress the first compressed shortest path matrix to form a second compressed shortest path matrix comprising a second compressed number of the plurality of map intersection nodes that is fewer in number than the first compressed number of the plurality of map intersection nodes by compressing adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes;
storing the second compressed shortest path matrix in a random access memory cache;
storing, in the random access memory cache, a small distance matrix associated with the first location and retrieved from the second compressed shortest path matrix after receiving the first delivery order, the small distance matrix being smaller than the compressed shortest path matrix;
receiving an additional delivery order for an additional delivery at the first location;
determining an additional shortest path delivery route for the additional delivery at the first location using the small distance matrix stored in the random access memory cache; and receiving a second delivery order for delivery of a second order at a second location; and
determining the shortest path delivery route for the first delivery order at the first location using the compressed shortest path matrix comprises determining the shortest path delivery route for the first delivery order at the first location and also for the second delivery order at the second location using the second compressed shortest path matrix.

14. A method comprising:
preparing an initial shortest path matrix comprising a plurality of elements, an initial number of a plurality of map intersection nodes, and a plurality of full shortest paths between an origination map intersection node and a destination map intersection node, wherein each element of the plurality of elements comprises a full shortest path of the plurality of full shortest paths, and each full shortest path of the plurality of full shortest paths comprises one or more map intersection nodes of the plurality of map intersection nodes;
obtaining a first set of compression rules for compressing, using one or more processors, the initial shortest path matrix by reducing the plurality of map intersection nodes in the initial shortest path matrix;
using the first set of compression rules and the one or more processors to compress the initial shortest path matrix to form a compressed shortest path matrix comprising a compressed number of the plurality of map intersection nodes that is fewer than the initial number of the plurality of map intersection nodes;
receiving a first delivery order for delivery of a first order at a first location; and
determining a shortest path delivery route for the first delivery order at the first location using the compressed shortest path matrix,
wherein:
the method further comprises receiving a second delivery order for delivery of a second order at a second location; and
determining the shortest path delivery route for the first delivery order at the first location using the compressed shortest path matrix comprises determining the shortest path delivery route for the first delivery order at the first location and also for the second delivery order at the second location using the compressed shortest path matrix.

15. A system comprising:
one or more processors; and
one or more non-transitory storage devices storing computing instructions configured to run on the one or more processors and perform acts of:
preparing an initial shortest path matrix comprising a plurality of elements, an initial number of a plurality of map intersection nodes, and a plurality of full shortest paths between an origination map intersection node and a destination map intersection node, wherein each element of the plurality of elements comprises a full shortest path of the plurality of full shortest paths, and each full shortest path of the plurality of full shortest paths comprises one or more map intersection nodes of the plurality of map intersection nodes;
obtaining a first set of compression rules for compressing, using the one or more processors, the initial shortest path matrix by reducing the plurality of map intersection nodes in the initial shortest path matrix; and using the first set of compression rules and the one or more processors to compress the initial shortest path matrix to form a compressed shortest path matrix comprising a compressed number of the plurality of map intersection nodes that is fewer than the initial number of the plurality of map intersection nodes, wherein:
    using the first set of compression rules and the one or more processors to compress the initial shortest path matrix to form the compressed shortest path matrix comprises using the first set of compression rules and the one or more processors to compress the initial shortest path matrix to form a first compressed shortest path matrix by replacing the full shortest path between the origination map intersection node and the destination map intersection node in each element of the plurality of elements with a single map intersection node of the plurality of map intersection nodes;
    the compressed number of the plurality of map intersection nodes that is fewer than the initial number of the plurality of map intersection nodes comprises a first compressed number of the plurality of map intersection nodes that is fewer than the initial number of the plurality of map intersection nodes; and
    the single map intersection node for a respective element of the plurality of elements comprises a next map intersection node in the full shortest path of the respective element of the plurality of elements.

16. The system of claim 15, wherein:
one or more full shortest paths of the plurality of full shortest paths of the initial shortest path matrix comprise multiple map intersection nodes of the plurality of map intersection nodes; and
the one or more non-transitory storage devices storing the computing instructions are configured to run on the one or more processors and perform an act of:
    using the first set of compression rules and the one or more processors to compress each of the one or more full shortest paths of the plurality of full shortest paths comprising the one or more map intersection nodes of the plurality of map intersection nodes in the initial shortest path matrix to form the single map intersection node of the plurality of map intersection nodes in the first compressed shortest path matrix.

17. The system of claim 15, wherein the one or more non-transitory storage devices storing the computing instructions are configured to run on the one or more processors and perform acts of:
    obtaining a second set of compression rules for compressing, using the one or more processors, the first compressed shortest path matrix by reducing the plurality of map intersection nodes in the first compressed shortest path matrix;
    using the second set of compression rules and the one or more processors to compress the first compressed shortest path matrix to form a second compressed shortest path matrix comprising a second compressed number of the plurality of map intersection nodes that is fewer in number than the first compressed number of the plurality of map intersection nodes by compressing adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes; and
    storing the second compressed shortest path matrix in a random access memory cache.

18. The system of claim 15, wherein the one or more non-transitory storage devices storing the computing instructions are configured to run on the one or more processors and perform an act of storing, in a random access memory cache, a small distance matrix associated with a first delivery location and retrieved from the compressed shortest path matrix after receiving a first delivery order, the small distance matrix being smaller than the compressed shortest path matrix.

19. The system of claim 18, wherein the one or more non-transitory storage devices storing the computing instructions are configured to run on the one or more processors and perform acts of:
    receiving an additional delivery order for an additional delivery at the first delivery location; and
    determining an additional shortest path delivery route for the additional delivery at the first delivery location using the small distance matrix stored in the random access memory cache.

20. The system of claim 15, wherein
one or more full shortest paths of the plurality of full shortest paths of the initial shortest path matrix comprise multiple map intersection nodes of the plurality of map intersection nodes; and
the one or more non-transitory storage devices storing the computing instructions are configured to run on the one or more processors and perform acts of:
    using the first set of compression rules and the one or more processors to compress each of the one or more full shortest paths of the plurality of full shortest paths comprising the one or more map intersection nodes of the plurality of map intersection nodes in the initial shortest path matrix to form the single map intersection node of the plurality of map intersection nodes in the first compressed shortest path matrix;
    obtaining a second set of compression rules for compressing, using the one or more processors, the first compressed shortest path matrix by reducing the plurality of map intersection nodes in the first compressed shortest path matrix;
    using the second set of compression rules and the one or more processors to compress the first compressed shortest path matrix to form a second compressed shortest path matrix comprising a second compressed number of the plurality of map intersection nodes that is fewer in number than the first compressed number of the plurality of map intersection nodes by compressing adjacent elements of the plurality of elements in a row in the first compressed shortest path matrix to form a single interval comprising a single interval map intersection node of the plurality of map intersection nodes when the adjacent elements comprise identical map intersection nodes of the plurality of map intersection nodes;
    storing the second compressed shortest path matrix in a random access memory cache;
    storing, in the random access memory cache, a small distance matrix associated with a first delivery location and retrieved from the compressed shortest path matrix after receiving a first delivery order, the small distance matrix being smaller than the compressed shortest path matrix;

receiving an additional delivery order for an additional delivery at the first delivery location; and determining an additional shortest path delivery route for the additional delivery at the first delivery location using the small distance matrix stored in the random access memory cache.

\* \* \* \* \*